United States Patent
Wenzel et al.

(10) Patent No.: US 7,186,182 B2
(45) Date of Patent: Mar. 6, 2007

(54) DRIVE LINE FOR DOWN HOLE MUD MOTOR

(76) Inventors: William R Wenzel, 1738 Kensit Place, Edmonton, AL (CA) T6L 6X7; Daryl A Ronaghan, 4824-32 Avenue, Edmonton, AL (CA) T6L 4H9

( * ) Notice: Subject to any disclaimer, the term of this patent is extended or adjusted under 35 U.S.C. 154(b) by 0 days.

(21) Appl. No.: 11/119,198

(22) Filed: Apr. 29, 2005

(65) Prior Publication Data
US 2005/0272507 A1    Dec. 8, 2005

(30) Foreign Application Priority Data
Jun. 7, 2004    (CA) .................................... 2472642

(51) Int. Cl.
*E21B 17/02*    (2006.01)
(52) U.S. Cl. ......................... 464/19; 464/155
(58) Field of Classification Search ........ 464/139–140, 464/147, 155, 19; 175/325.2, 325.3, 325.4, 175/325.6
See application file for complete search history.

(56) References Cited

U.S. PATENT DOCUMENTS

| | | | |
|---|---|---|---|
| 4,772,246 A | * | 9/1988 | Wenzel ........................ 464/155 |
| 5,267,905 A | | 12/1993 | Wenzel et al. |
| 5,588,818 A | * | 12/1996 | Houmand et al. .......... 464/155 |

* cited by examiner

*Primary Examiner*—Aaron Dunwoody
(74) *Attorney, Agent, or Firm*—Christensen O'Connor Johnson Kindness PLLC

(57) ABSTRACT

A drive line for a down hole mud motor has a plurality of elongate keys extending radially from an exterior surface of a central shaft for the purpose of transmitting torque. A plurality of circumferentially spaced axial keyways are provided in an interior surface of each end housing, which are adapted to receive the keys. Each of the keys has opposed sides, opposed ends and a front face. The front face is radiused both in a first direction between the opposed ends and in a second direction between the opposed sides, thereby accommodating the omni-directional pivotal movement of the shaft relative to the housing. The use of keys for torque transmission increases available contact area, with a corresponding increase in torque load capacity.

1 Claim, 5 Drawing Sheets

SECTIONS A-A & B-B

DRIVE LINE FOR DOWN HOLE MUD MOTOR

FIELD OF THE INVENTION

The present invention relates to a drive line which is used when drilling wells to connect a power section and a bit section of a down hole motor, with particular application or moineau-style mud motor power sections.

BACKGROUND OF THE INVENTION

U.S. Pat. No. 5,267,905 (Wenzel et al from 1993) is an example of a common style of drive line, which has been used successfully for the past decade. This style of drive line will hereinafter be referred to as a circumferential ball drive line. In the circumferential ball drive line, balls are used to transfer torque between a central shaft and end housings. At each end, there are six or eight pockets in the exterior surface disposed around a circumference of the central shaft. Six or eight corresponding pockets are disposed within an interior surface of each of the end housings. By positioning balls in the respective pockets of the central shaft and the end housings, torque can be transferred, while accommodating omni-directional movement of the central shaft within the end housings.

In the past few years there has been a movement to longer power sections. As the rotors and stators in the power sections are lengthened, the power sections have produced greater torque. The torque output of the power sections has increased to the point that drive line failures are being experienced in circumferential ball drive lines.

SUMMARY OF THE INVENTION

What is required is a drive line for a down hole mud motor which is capable of handling greater torque than circumferential ball drive lines.

According to the present invention there is provided a drive line for a down hole mud motor which includes a central shaft and two end housings. The central shaft has opposed ends and an exterior surface. A ball seat is provided at each of the opposed ends of the shaft. The end housings each have an interior surface and a centrally disposed ball seat. Balls are positioned between the ball seat at each of the opposed ends of the shaft and the ball seat in the end housings, thereby facilitating omni-directional pivotal movement between the shaft and the end housings. A plurality of elongate keys extend radially from the exterior surface of the shaft at each of the opposed ends. A plurality of circumferentially spaced axial keyways are provided in the interior surface of the end housings, which are adapted to receive the keys. Each of the keys has opposed sides, opposed ends, a back face and a front face. The front face is radiused both in a first direction between the opposed ends and in a second direction between the opposed sides, thereby accommodating the omni-directional pivotal movement of the shaft relative to the housing.

The use of elongate keys, as described above, greatly increases the surface contact area and, thereby increases the torque load capacity of the drive line. It is preferred that both the exterior surface of the shaft and the interior surface of the end housings be provided with an integrally formed engagement spline. The keys can then be positioned between and obtain support from the engagement spline. The front face of each key protrudes above the engagement spline, to accommodate the desired omni-directional relative pivotal movement of the shaft and end housings.

BRIEF DESCRIPTION OF THE DRAWINGS

These and other features of the invention will become more apparent from the following description in which reference is made to the appended drawings, the drawings are for the purpose of illustration only and are not intended to in any way limit the scope of the invention to the particular embodiment or embodiments shown, wherein.

DETAILED DESCRIPTION OF THE PREFERRED EMBODIMENT

Figure 1:
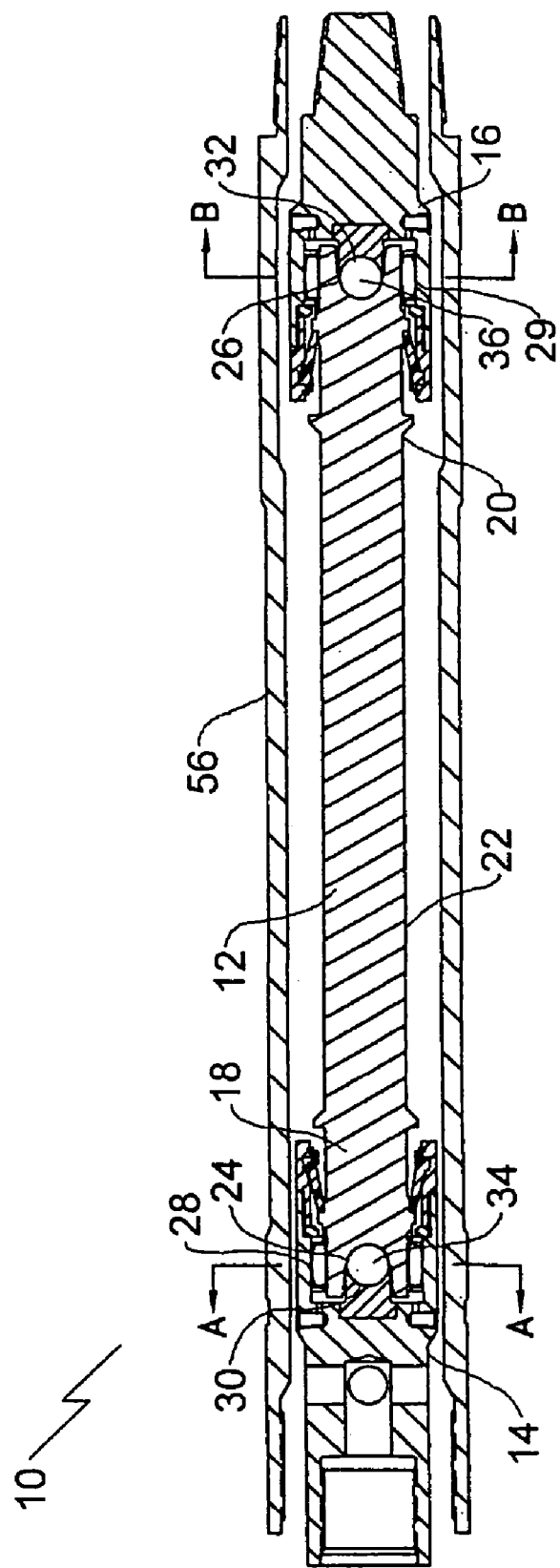
FIG. 1 is a side elevation view, in section, of a drive line for a down hole mud motor constructed in accordance with the teachings of the present invention.

The preferred embodiment, a drive line for a down hole mud motor generally identified by reference numeral 10, will now be described with reference to FIGS. 1 through 5.

Figure 3:
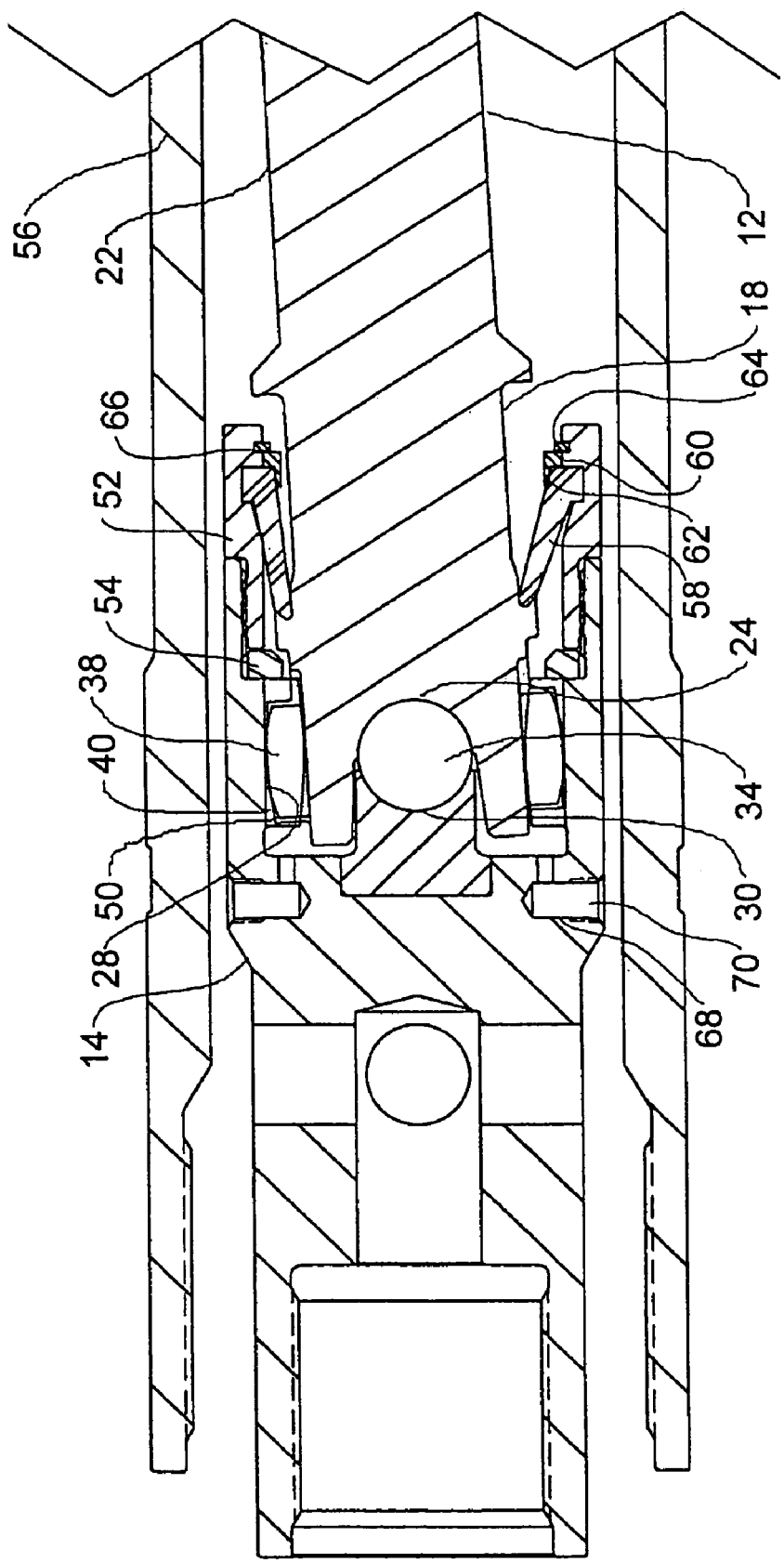
FIG. 3 is a detailed side elevation view, in section, of a first end of the drive line for a down hole mud motor illustrated in FIG. 1.
Figure 4:
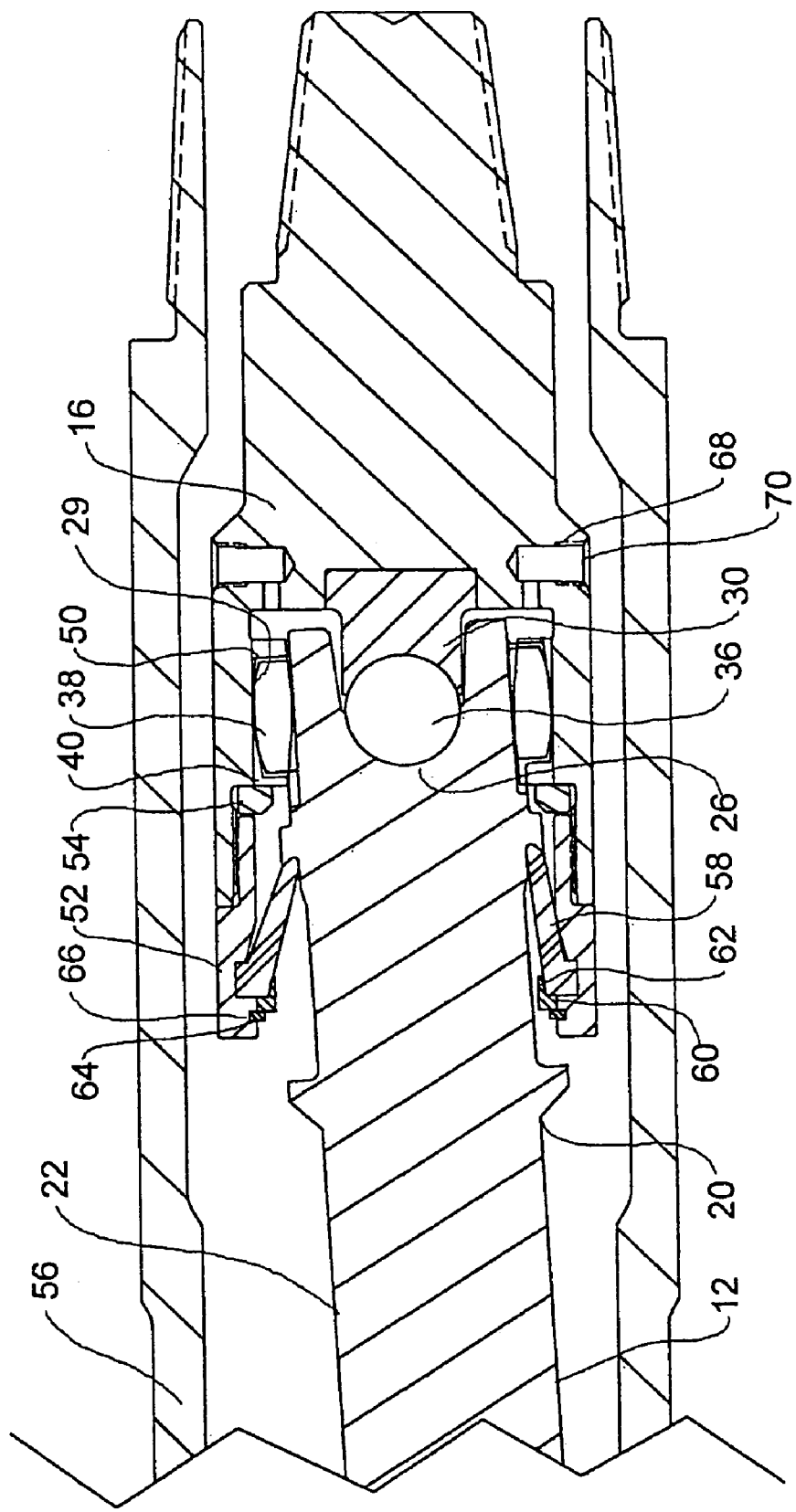
FIG. 4 is a detailed side elevation view, in section, of a second end of the drive line for a down hole mud motor illustrated in FIG. 1.
Figure 5:
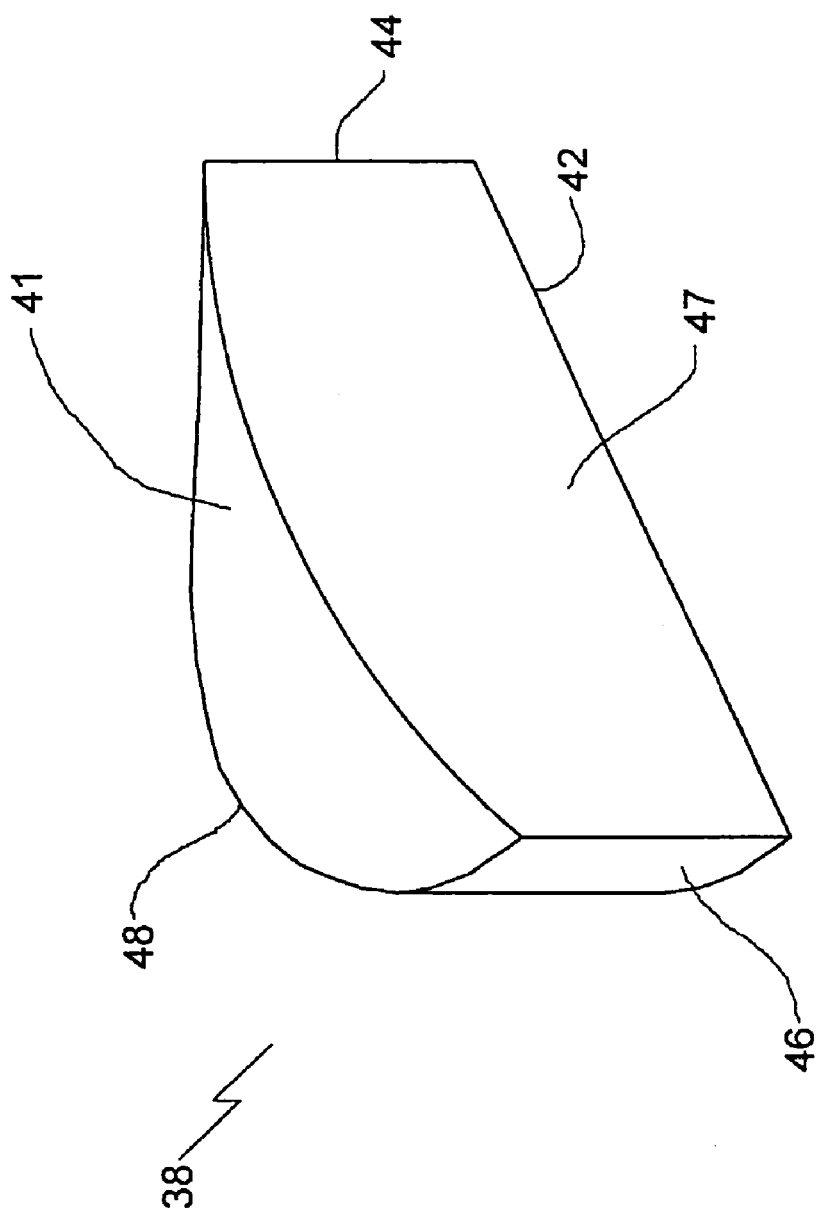
FIG. 5 is a detailed perspective view of an elongate key from the drive line for a down hole mud motor illustrated in FIG. 1.

Structure and Relationship of Parts:

Referring to FIG. 1, drive line 10 includes a central shaft 12 and two end housings 14 and 16. Central shaft 12 has opposed ends 18 and 20 and an exterior surface 22. A ball seat 24 and 26 is provided at each of opposed ends 18 and 20 of shaft 12. End housings 14 and 16 each have an interior surface 28 and 29 and a centrally disposed ball seat 30 and 32. Balls 34 and 36 are positioned between ball seats 24 and 26 at each of opposed ends 18 and 20, respectively, of shaft 12 and ball seats 30 and 32 in end housings 14 and 16, thereby facilitating omni-directional pivotal movement between shaft 12 and end housings 14 and 16. Referring now to FIGS. 3 and 4, a plurality of elongate keys 38 extend radially from exterior surface 22 of shaft 12 at each of opposed ends 18 and 20, respectively. A plurality of circumferentially spaced axial keyways 40 are provided in interior surface 28 and 29 of end housings 14 and 16, respectively, which are adapted to receive keys 38. Referring to FIG. 5, each of the keys 38 has opposed sides 41 and 42, opposed ends 44 and 46, a back face 47 and a front face 48. Front face 48 is radiused both in a first direction between opposed ends 44 and 46 along side 41, where side 42 is flat, and in a second direction between opposed sides 41 and 42 along front face 48, where back face 47 is flat, thereby accommodating the omni-directional pivotal movement of shaft 12 relative to housing 14 or 16, as the case may be.

The use of elongate keys 38, as described above, greatly increases the surface contact area, and thereby increases the torque load capacity of the drive line. Referring to FIGS. 3 and 4, in order to reduce the stress upon keys 38, it is preferred that both the exterior surface 22 of shaft 12 and the interior surface 28 of end housings 14 and 16 be provided with an integrally formed engagement spline 50. Keys 38 can then be positioned between, and obtain support from, engagement spline 50. Front face 48 of each key 38 protrudes above engagement spline 50, to accommodate the desired omni-directional relative pivotal movement of shaft 12 and end housings 14 and 16. It may also be desired to trim engagement spline 50 in such a manner that keys 38 are given even more room to move.

End housings 14 and 16 and ends 18 and 20 of shaft 12 are held together by a threaded retaining nut 52 which presses against a split retaining ring 54. To protect against drilling fluid that will flow down between the outer housing 56 illustrated, and drive line 10, a rubber seal 58 is carried by retaining nut 54 which acts as a seal between end housings 14 and 16 and ends 18 and 20 of shaft 12. Rubber seal 58 itself is held in position by its own retaining ring 60 that has an overlapping lip 62. Retaining ring 60 is prevented from being withdrawn by a snap ring 64 that fits in a groove 66 in retaining nut 54. There are also provided grease ports 68 for filling the mechanism end housings 14 and 16 with grease. These ports have plugs 70 that are removed to refill grease port 68 with grease.

Figure 2:
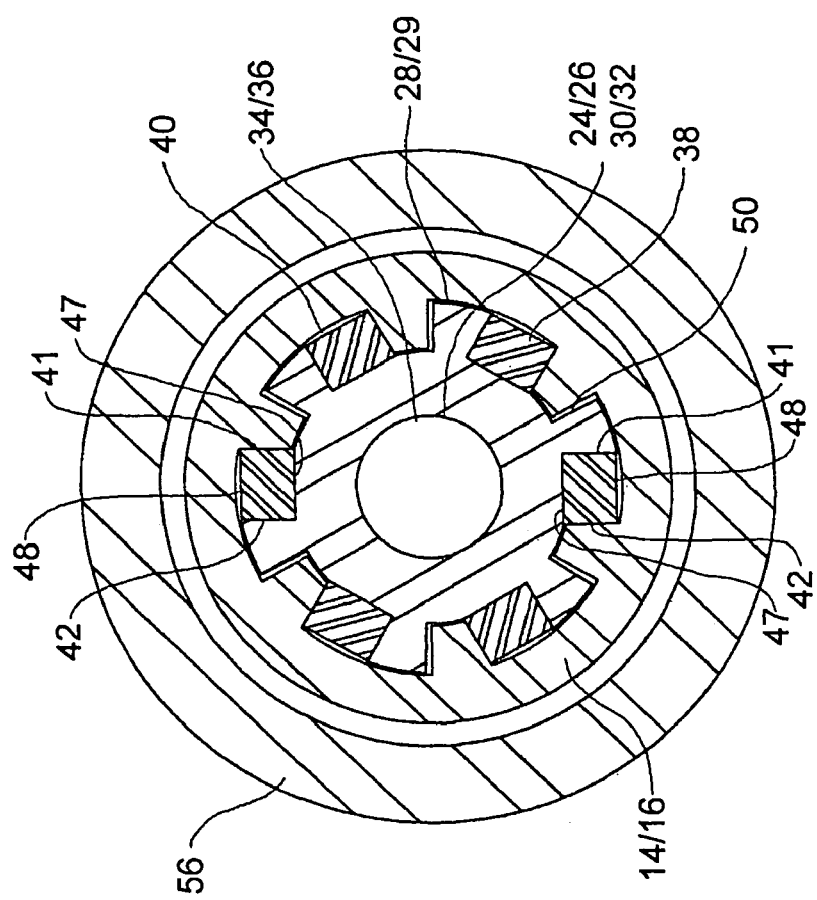
FIG. 2 is a section view of the drive line for a down hole mud motor taken along section lines A—A and B—B of FIG. 1.

Operation:

In operation, input from the power section is applied at the end with housing 16. This operates in an eccentric fashion and must be converted to a smooth rotary motion for use by the bit section which is connected at the end with housing 14. When input into the end with housing 16, it is housing 16 that applies torque to shaft 12. At the other end, the torque in shaft 12 is then transmitted to end housing 14. Mud that flows between outer housing 56 and shaft 12 is stopped from entering housings 14 and 16 by rubber seal 58. The means by which a smooth rotary motion is obtained will now be discussed. In FIG. 2, six keys 38 are illustrated and can be considered as opposite pairs. At any given time each pair of keys 38 will be doing something slightly different in axial keyways 40. Forces directed from back face 47 to front face 48 causes keys 38 to rock forward and back, while forces directed from side to side causes keys 38 to rock from side to side. The motion may be a combination, and keys 38 will move accordingly.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent to one skilled in the art that modifications may be made to the illustrated embodiment without departing from the spirit and scope of the invention as hereinafter defined in the claims.

The embodiments of the invention in which an exclusive property or privilege is claimed are defined as follows:

1. A drive line for a down hole mud motor, comprising:
   a central shaft having opposed ends and an exterior surface;
   a ball seat at each of the opposed ends of the shaft;
   end housings, each having an interior surface and a centrally disposed ball seat;
   an integrally formed engagement spline on the exterior surface of the shaft and the interior surface of each of the end housings;
   balls positioned between the ball seat at each of the opposed ends of the shaft and the ball seat in the end housings, thereby facilitating omni-directional pivotal movement between the shaft and the end housings;
   a plurality of elongate keys extending radially from the exterior surface of the shaft at each of the opposed ends, the keys being axially movable relative to the exterior surface of the shaft;
   a plurality of circumferentially spaced axial keyways in the interior surface of the end housings which are adapted to receive the keys, the keyways being formed by overlapping the engagement spline of the end housings and the engagement spline of the shaft; and
   each of the keys having opposed sides, opposed ends, a back face and a front face that is radiused in a first direction between the opposed ends and in a second direction between the opposed sides, thereby accommodating the omni-directional pivotal movement of the shaft relative to the housing, the front face of each of the keys protruding past the engagement spline.

* * * * *